United States Patent
Lee

(10) Patent No.: US 9,890,822 B2
(45) Date of Patent: Feb. 13, 2018

(54) APPARATUS AND METHOD FOR CONTROLLING VEHICLE CLUTCH

(71) Applicants: Hyundai Motor Company, Seoul (KR); KIA MOTORS CORP., Seoul (KR)

(72) Inventor: Ho Young Lee, Bucheon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 44 days.

(21) Appl. No.: 14/931,739

(22) Filed: Nov. 3, 2015

(65) Prior Publication Data
US 2016/0377128 A1    Dec. 29, 2016

(30) Foreign Application Priority Data

Jun. 26, 2015    (KR) .......................... 10-2015-0091361

(51) Int. Cl.
*F16D 48/06*    (2006.01)
*B60W 10/02*    (2006.01)
(Continued)

(52) U.S. Cl.
CPC ........... *F16D 48/06* (2013.01); *F16H 61/688* (2013.01); *F16H 63/46* (2013.01); *B60W 10/02* (2013.01);
(Continued)

(58) Field of Classification Search
CPC .... B60W 10/02; B60W 10/06; B60W 10/113; B60W 2510/0657; B60W 2510/1005;
(Continued)

(56) References Cited

U.S. PATENT DOCUMENTS

| 8,874,339 B2* | 10/2014 | Yoon .................. F16D 48/06 701/67 |
| 2008/0214354 A1 | 9/2008 | Dickinson |
| 2013/0332038 A1* | 12/2013 | Williams .............. F16D 48/00 701/59 |

FOREIGN PATENT DOCUMENTS

| JP | 2008-044523 A | 2/2008 |
| JP | 2008-179320 A | 8/2008 |

(Continued)

OTHER PUBLICATIONS

Machine translation of JP 2014176179A, downloaded from epo.org on Mar. 10, 2017.*

*Primary Examiner* — Ramya Burgess
*Assistant Examiner* — David Morris
(74) *Attorney, Agent, or Firm* — McDermott Will & Emery LLP

(57) ABSTRACT

A method and an apparatus for controlling a clutch of a vehicle include determining whether a vehicle is moving under a condition in which a gearshift is coupled to the clutch. A clutch torque is learned in which the clutch is maintained in a micro-slip state by decreasing a target clutch torque for a corresponding gear level when it is determined that the vehicle is moving under the condition in which the gearshift is coupled to the clutch. Learning reliability is calculated by reflecting a difference between an engine torque and clutch torque. The clutch is maintained in the micro-slip state for the clutch torque learning or converting the clutch into a lock-up state, depending on a learning reliability level.

9 Claims, 3 Drawing Sheets

(51) Int. Cl.
   *B60W 10/06*    (2006.01)
   *F16H 63/46*    (2006.01)
   *F16H 61/688*   (2006.01)
   B60W 10/113    (2012.01)
   F16H 61/04     (2006.01)
   F16H 59/46     (2006.01)
   F16H 61/00     (2006.01)

(52) U.S. Cl.
   CPC ........... *B60W 10/06* (2013.01); *B60W 10/113* (2013.01); *B60W 2510/0275* (2013.01); *B60W 2510/0657* (2013.01); *B60W 2510/1005* (2013.01); *B60W 2710/025* (2013.01); *F16D 2500/10412* (2013.01); *F16D 2500/5026* (2013.01); *F16H 2059/465* (2013.01); *F16H 2061/0087* (2013.01); *F16H 2061/0459* (2013.01)

(58) Field of Classification Search
   CPC ..... B60W 2510/0275; B60W 2710/025; F16D 48/06
   See application file for complete search history.

(56) References Cited

FOREIGN PATENT DOCUMENTS

| | | |
|---|---|---|
| JP | 2014-176179 A | 9/2014 |
| JP | 2015-102241 A | 6/2015 |
| KR | 10-2014-0048006 A | 4/2014 |
| KR | 10-2014-0055192 A | 5/2014 |
| KR | 10-2014-0103619 A | 8/2014 |

\* cited by examiner

-- RELATED ART --

10: VEHICLE

APPARATUS AND METHOD FOR CONTROLLING VEHICLE CLUTCH

CROSS REFERENCE TO RELATED APPLICATION

The present application claims the benefit of priority to Korean Patent Application No. 10-2015-0091361 filed Jun. 26, 2015, the entire content of which is incorporated herein for all purposes by this reference.

TECHNICAL FIELD

The present disclosure generally relates to a vehicle clutch controlling technique. More particularly, the present disclosure relates to an apparatus and a method for controlling a vehicle clutch, which control the frequency of clutch torque learning through micro-slip control to secure learning performance and to prevent deterioration in both clutch durability and fuel efficiency.

BACKGROUND

An automated manual transmission is a system for automatically controlling a manual transmission. Unlike an automatic transmission that uses a torque converter and a wet-type multi-disk clutch, the automated manual transmission transmits an engine torque using a dry clutch.

Particularly, according to the dry clutch, a clutch transmission torque varies due to various factors from component errors, abrasion due to wear, thermal deformation caused by high temperature, to a variation in coefficient of friction of disks. Accordingly, it is difficult to estimate the transmitted torque while driving a vehicle.

When the variation in transmission torque is not detected when the clutch is being controlled, an algorithm for estimating torque characteristics of a dry clutch in real-time is necessary because excessive slip of the clutch or shock may occur in the clutch.

A conventional method estimates the clutch transmission torque through micro-slip control of a clutch, which predicts a torque-stroke (T-S) curve of the dry clutch in real time. The T-S curve illustrates a transmission torque characteristic of a dry clutch depending on a stroke of a clutch actuator.

For example, referring to FIG. 1, clutch speed and engine speed are controlled to maintain a micro-slip state by lowering a target torque of a clutch while a gearshift is engaged. Since an angular velocity of an engine is constant under the micro-slip condition, engine rotational inertia is not considered, and thus, the engine torque and the clutch torque are physically the same. Accordingly, the T-S curve may be obtained through the micro-slip control, which uses the engine torque and the stroke of the clutch actuator.

The characteristic of a dry clutch varies in real time, and thus, the micro-slip control is required continually for estimating the characteristic of the dry clutch so as to secure the operability and controllability of a dual-clutch transmission (DCT).

However, the micro-slip control causes a continuous small slip in the clutch, which may decrease durability of the clutch. In addition, since the engine RPM needs to be continuously controlled to be greater than 30 revolutions per minute (RPM), fuel efficiency may decrease.

In order to predict the T-S curve characteristic, continuous learning of the clutch torque is necessary, and thus, the micro-slip control should be continuously performed.

The foregoing is intended merely to aid in the understanding of the background of the present disclosure, and is not intended to mean that the present disclosure falls within the purview of the related art that is already known to those skilled in the art.

SUMMARY

The present disclosure has been made keeping in mind the above problem occurring in the conventional art, and an object of the present disclosure is to provide an apparatus and a method for controlling a vehicle clutch, which controls the frequency of clutch torque learning through micro-slip control, to secure learning performance and to prevent deterioration in both clutch durability and fuel efficiency.

According to an exemplary embodiment of the present inventive concept, a method for controlling a clutch of a vehicle includes a driving determination operation for determining whether a vehicle is moving under a condition in which a gearshift is coupled to the clutch. A clutch torque is learned in a learning operation in which the clutch is maintained in a micro-slip state by decreasing a target torque of the clutch for a corresponding gear level, when it is determined that the vehicle is moving under the condition in which the gearshift is coupled to the clutch. Learning reliability is calculated in a calculation operation by reflecting a difference between an engine torque and clutch torque. The micro-slip state of the clutch is maintained to learn the clutch torque or the clutch is converted into a lock-up state in a control operation, depending on a learning reliability level.

The driving determination operation may perform the determination when gear shifting for the target gear is completed.

The calculation operation may calculate the learning reliability when the clutch torque learning starts.

The control operation may include a lock-up control operation for converting the clutch into the lock-up state when the calculated learning reliability is greater than an upper limit reference value.

The control operation further includes, after the lock-up control operation, a learning reliability determination operation for determining the learning reliability by reflecting one or more of declination factors which cause a decline in the learning reliability and for determining whether the determined learning reliability is less than a lower limit reference value. The one or more declination factors include a clutch torque learning maintenance time, an engine torque variation, and a clutch temperature variation.

The learning reliability determination operation learns the clutch torque by converting the clutch into the micro-slip state when the learning reliability, which is determined by the one or more declination factors, is less than the lower limit reference value and may maintain the clutch in the lock-up state when the learning reliability, which is determined by the one or more declination factors, is equal to or greater than the lower limit reference value.

When the calculated learning reliability is equal to or less than the upper limit reference value in the control operation, the learning operation for learning the clutch torque in the micro-slip state is performed when the calculated learning reliability is equal to or less than the upper limit reference value.

After the learning operation, the learning of the clutch torque may be stopped when gear shifting starts newly.

According to another exemplary embodiment of the present inventive concept, an apparatus for controlling a clutch of a vehicle includes a determinator configured to determine whether the vehicle is moving under a condition in which a gearshift is coupled to a clutch. A controller is configured to learn a clutch torque by maintaining the clutch in a micro-slip state by decreasing a target torque of the clutch for a corresponding gear level, when it is determined that the vehicle is moving under the condition in which the gearshift is coupled to the clutch. A calculator is configured to calculate and store learning reliability by reflecting a difference between an engine torque and the clutch torque while learning the clutch torque. The controller is configured to maintain the clutch in the micro-slip state to learn the clutch torque or to convert the clutch into a lock-up state, depending on a learning reliability level.

As described above, the method according to the present disclosure controls a clutch to prevent occurrence of slip when a difference between an engine torque and a clutch torque is greater than a predetermined level during micro-slip control of the clutch for clutch torque learning. Accordingly, the frequency of the micro-slip control is reduced, and thus, it is possible to improve clutch durability and fuel efficiency. Consequently, performance of a transmission system may be improved.

BRIEF DESCRIPTION OF THE DRAWINGS

The above and other objects, features and other advantages of the present disclosure will be more clearly understood from the following detailed description taken in conjunction with the accompanying drawings.

DETAILED DESCRIPTION

Exemplary embodiments of the present inventive concept will be described in detail with reference to the accompanying drawings.

A method for controlling a vehicle clutch according to the present disclosure includes a driving determination step (S10), a learning step (S20), a calculation step (S30), and a control step (S40).

Figure 2:
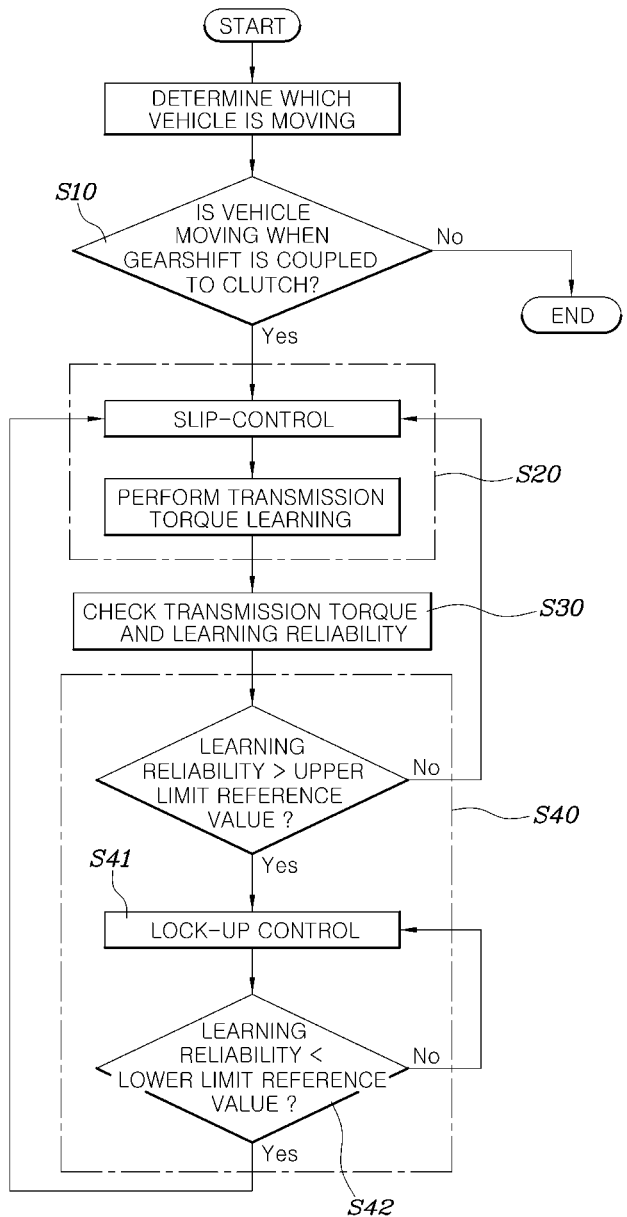
FIG. 2 is a flowchart illustrating a method for controlling a vehicle clutch according to the present disclosure.

Referring to FIG. 2, it is determined at the driving determination step (S10) whether a vehicle moves under a condition in which a gear is coupled to a clutch.

Figure 1:
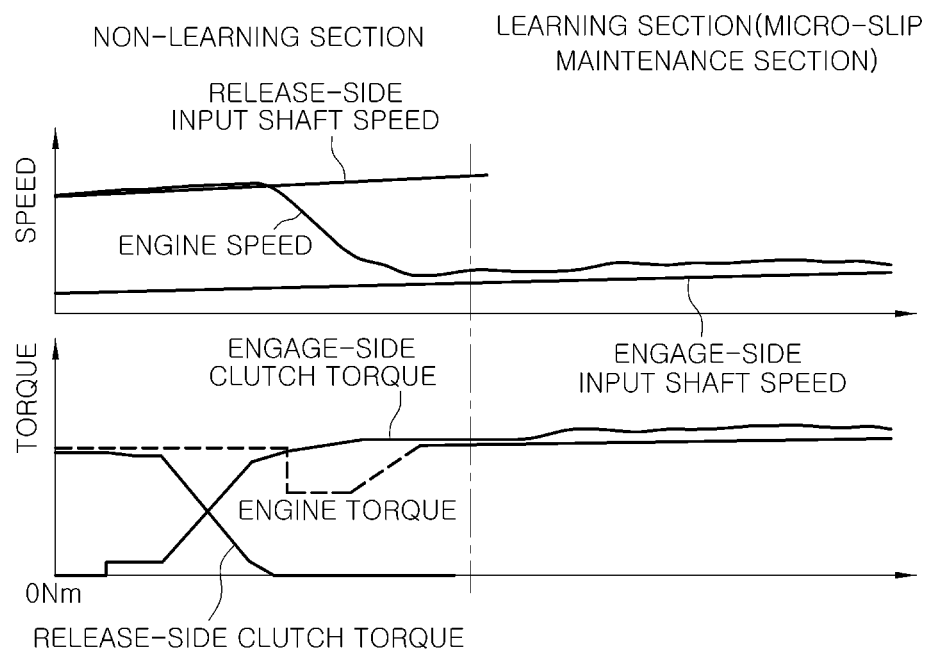
FIG. 1 depicts graphs illustrating an engine speed, a clutch speed, and a torque in a vehicle having a dual-clutch transmission (DCT).

For example, the method of the present disclosure may be applied to a vehicle having the conventional dual-clutch transmission (DCT) which is an automated manual transmission of FIG. 1. The DCT includes an engage-side clutch and a release-side clutch as a pair and configures a gear level with the gear to provide a driving speed of the vehicle.

In the case of DCT, the driving determination step (S10) may be performed after gear shifting for a target gear level is completed. For example, the gear shifting may be completed just after or a set period of time once an engine torque matches with an engage-side clutch torque after torque transfer between the engage-side clutch and the release-side clutch.

Figure 3A:
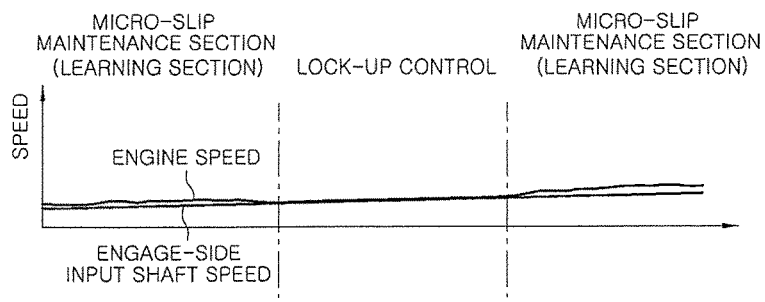
FIGS. 3A and 3B are graphs showing a slip control section and a lock-up control section depending on learning reliability using a method for controlling a vehicle clutch according to the present disclosure.
Figure 3B:
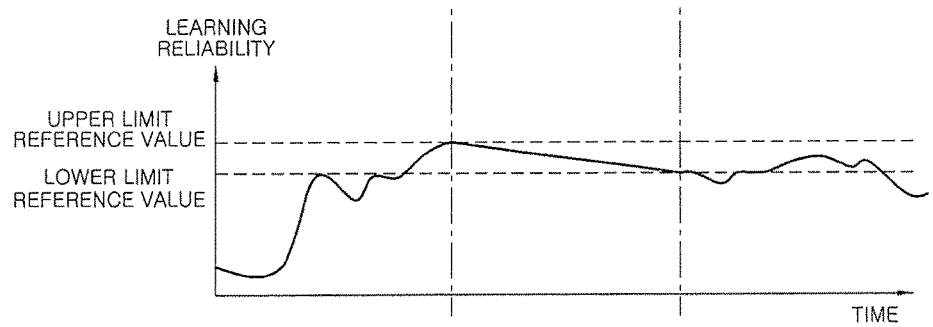

Referring to FIGS. 2-3B, when it is determined at the driving determination step (S10) that the vehicle moves under the condition in which the gear is coupled to the clutch, the learning step (S20) maintains a micro-slip state of the engage-side clutch by decreasing a target torque of the clutch that configures a corresponding gear level, whereby clutch torque learning may be performed.

However, when the gear shifting restarts after the learning step (S20), the clutch torque learning is stopped and the gear shifting may start.

Next, the calculation step (S30) may calculate learning reliability by reflecting a difference between the engine torque and the clutch torque.

When the difference between the engine torque and the clutch torque becomes smaller, the learning reliability is calculated to be higher. On the other hand, when the difference between the engine torque and the clutch torque becomes greater, the learning reliability may be calculated to be lower. The learning reliability may be calculated when the clutch torque learning starts.

At the control step (S40), depending on a learning reliability level, the micro-slip state of the clutch is maintained for the clutch torque learning, or the clutch may be controlled to convert the micro-slip state into a lock-up state.

In the lock-up state, the clutch is controlled with a torque that is greater than a safety factor so that clutch discs are completely attached, and thus, slipping of the clutch is prevented.

For example, the control step (S40) may further include a lock-up control step (S41) for converting a clutch state into the lock-up state when the calculated learning reliability is greater than an upper limit reference value.

After the control step (S40), the learning step (S20) may be performed in which the clutch torque learning is performed by maintaining the micro-slip state of the clutch, when the calculated learning reliability is equal to or less than the upper limit reference value.

According to the present disclosure, when the difference between the engine torque and the clutch torque is equal to or greater than a predetermined level during the micro-slip control for the clutch torque learning, the clutch is prevented from slipping. Accordingly, the frequency of the slip control of the clutch can be reduced, and thus, durability of the clutch is improved and fuel efficiency is increased. Consequently, performance of a transmission is improved.

After the lock-up control step (S41), the method of the present disclosure may further include a learning reliability determination step (S42) in which the learning reliability is determined by one or more declination factors causing a decline in the learning reliability, including a clutch torque learning maintenance time, a variation in engine torque, and a variation in clutch temperature.

For example, after the clutch torque learning, the learning reliability may gradually decrease over time.

After the clutch torque learning, as the variation in the engine torque becomes higher, the learning reliability may gradually decrease.

After the clutch torque learning, as the variation in the clutch temperature is higher, the learning reliability may gradually decrease.

Therefore, at the learning reliability determination step (S42), when the learning reliability, which is determined by the one or more declination factors, is less than a lower limit reference value, the clutch torque learning is performed by converting the clutch state into the micro-slip state. On the other hand, when the learning reliability, which is determined by the one or more declination factors, is equal to or greater than the lower limit reference value, the clutch is controlled to maintain the lock-up state.

Figure 4:
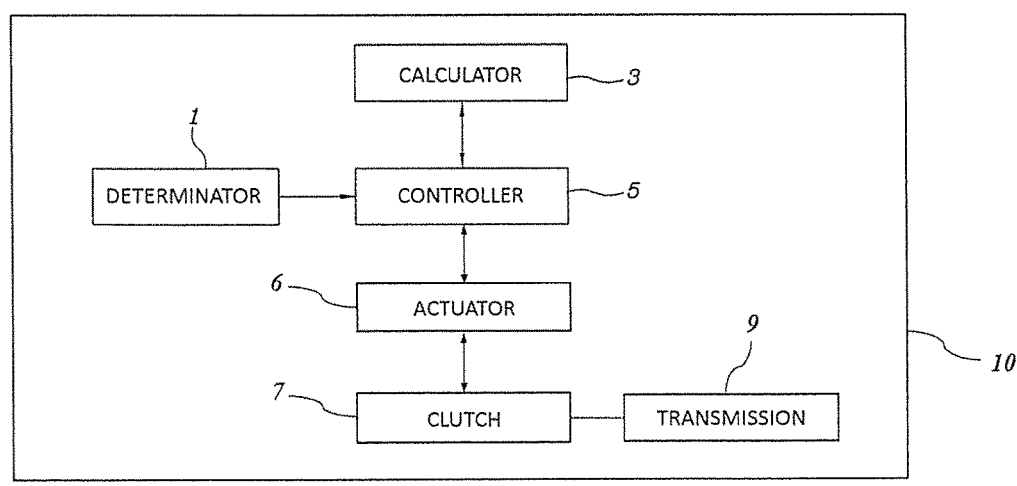
FIG. 4 is a block diagram of an apparatus for controlling a vehicle clutch according to the present disclosure.

Referring to FIG. 4, an apparatus for controlling a vehicle clutch according to the present disclosure may include a determinator 1, a calculator 3, and a controller 5, in which the determinator 1 and the calculator 3 may be processors such as a computer, and the controller 5 may be an electronic control unit (ECU).

First, the determinator 1 may determine whether a vehicle moves under a condition in which a gearshift is coupled to a clutch.

The calculator 3 may calculate and store learning reliability by reflecting a difference between an engine torque and a clutch torque during clutch torque learning. In this case, the learning reliability may be stored in a separate storage.

When it is determined that a vehicle moves under the condition in which the gearshift is coupled to the clutch, the controller 5 may learn the clutch torque by maintaining the micro-slip state of the clutch by decreasing a clutch target torque for a corresponding gear level.

The controller 5 may control the clutch to maintain the micro-slip state for learning the clutch torque or to convert the state into the lock-up state, depending on a learning reliability level.

Hereinafter, a control flow according to the vehicle clutch control method of the present disclosure will be described.

Referring to FIGS. 2 and 3A-3B, after gear shifting for a target gear level is completed, whether a vehicle moves by driving an engine is determined (S10). When it is determined that the vehicle is moving, clutch torque learning is performed through micro-slip control of a clutch (S20).

Then, learning reliability is calculated using a difference between a clutch torque and an engine torque (S30).

When the calculated learning reliability is greater than a upper limit reference value, the clutch is controlled not to slip by locking up the clutch (S41). When the calculated learning reliability is equal to or less than the upper limit reference value, the clutch torque learning is performed through the micro-slip control of the clutch (S20).

After the clutch is locked-up, the learning reliability is calculated by reflecting various factors causing a decline in the learning reliability. When the learning reliability, which is calculated by reflecting the one or more declination factors, is less than a lower limit reference value, the clutch state is converted into a micro-slip state and the clutch torque learning is performed (S20). When the learning reliability is equal to or greater than the lower limit reference value, the clutch is controlled to maintain the lock-up state (S41).

As described above, during the micro-slip control of a clutch for clutch torque learning, the method according to the present disclosure controls the clutch to prevent occurrence of clutch slip when a difference between an engine torque and a clutch torque is greater than a predetermined level. Accordingly, the frequency of micro-slip control of the clutch is reduced. Therefore, it is possible to improve clutch durability and fuel efficiency, thus improving performance of a transmission.

Although the exemplary embodiments of the present inventive concept have been disclosed for illustrative purposes, those skilled in the art will appreciate that various modifications, additions, and substitutions are possible, without departing from the scope and spirit of the invention as disclosed in the accompanying claims.

What is claimed is:

1. A method for controlling a clutch of a vehicle, comprising:
    a driving determination operation for determining whether the vehicle is moving under a condition in which the clutch is engaged with a transmission gear for a gear shifting to a target gear level;
    a learning operation of a clutch torque by updating a relation between the clutch torque and an actuator stroke, in which the clutch is maintained in a micro-slip state by decreasing a target torque of the clutch for a corresponding gear level when it is determined that the vehicle is moving under the condition in which the clutch is engaged with the transmission gear for the gear shifting to the target gear level;
    a calculation operation for calculating a learning reliability based on a difference between an engine torque and the clutch torque; and
    a control operation for maintaining the micro-slip state of the clutch to learn the clutch torque or for converting the clutch into a lock-up state, depending on a level of the learning reliability,
    wherein the calculated learning reliability increases when the difference between the engine torque and the clutch torque decreases, and the calculated learning reliability decreases when the difference between the engine torque and the clutch torque increases.

2. The method of claim 1, wherein the driving determination operation performs the determination when the gear shifting to the target gear level is completed.

3. The method of claim 1, wherein the calculation operation calculates the learning reliability when the learning operation of the clutch torque starts.

4. The method of claim 1, wherein the control operation comprises a lock-up control operation for converting the clutch into the lock-up state when the calculated learning reliability is greater than an upper limit reference value.

5. The method of claim 4, further comprising, after the lock-up control operation:
    a learning reliability determination operation for determining the learning reliability based on one or more declination factors which cause a decline in the learning reliability and for determining whether the determined learning reliability is less than a lower limit reference value,
    wherein the one or more declination factors include a clutch torque learning maintenance time, an engine torque variation, and a clutch temperature variation, and
    wherein, after the learning operation of the clutch torque, the learning reliability gradually declines when the clutch torque learning maintenance time becomes longer than a reference time, the engine torque variation becomes greater than a reference engine torque, or the clutch temperature variation becomes greater than a reference temperature variation.

6. The method of claim 5, wherein in the learning reliability determination operation,
    the clutch torque is learned by converting the clutch into the micro-slip state when the learning reliability updated by the one or more declination factors is less than the lower limit reference value, and
    the clutch is maintained in the lock-up state when the learning reliability updated by the one or more declination factors is equal to or greater than the lower limit reference value.

7. The method of claim 4, wherein when the calculated learning reliability is equal to or less than the upper limit reference value in the control operation, the learning operation of the clutch torque in the micro-slip state is performed.

8. The method of claim 1, wherein after the learning operation, the clutch torque is stopped when a new gear shifting starts.

9. An apparatus for controlling a clutch of a vehicle, comprising:
- a determinator configured to determine whether the vehicle is moving under a condition in which the clutch is engaged with a transmission gear for a gear shifting to a target gear level;
- a controller configured to learn a clutch torque by updating a relation between the clutch torque and an actuator stroke, in which the clutch is maintained in a micro-slip state by decreasing a target torque of the clutch for a corresponding gear level when it is determined that the vehicle is moving under the condition in which the clutch is engaged with the transmission gear for the gear shifting to the target gear level; and
- a calculator configured to calculate and store a learning reliability based on a difference between an engine torque and the clutch torque while learning the clutch torque, wherein the controller is configured to maintain the clutch in the micro-slip state to learn the clutch torque or to convert the clutch into a lock-up state, depending on a level of the learning reliability, wherein the calculated learning reliability increases when the difference between the engine torque and the clutch torque decreases, and the calculated learning reliability decreases when the difference between the engine torque and the clutch torque increases.

* * * * *